(12) United States Patent
Wobben

(10) Patent No.: US 6,942,461 B2
(45) Date of Patent: Sep. 13, 2005

(54) ROTOR BLADE HUB

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 0 days.

(21) Appl. No.: 10/333,372

(22) PCT Filed: Jun. 20, 2001

(86) PCT No.: PCT/EP01/06926
§ 371 (c)(1),
(2), (4) Date: Jul. 11, 2003

(87) PCT Pub. No.: WO02/06667
PCT Pub. Date: Jan. 24, 2002

(65) Prior Publication Data
US 2004/0091358 A1 May 13, 2004

(30) Foreign Application Priority Data
Jul. 19, 2000 (DE) .......................................... 100 34 958

(51) Int. Cl.[7] .............................................. F04D 29/00
(52) U.S. Cl. .................................................. 416/210 R
(58) Field of Search ............................ 416/210 R, 248, 416/226, 211, 188, 210, 232, 91, 237

(56) References Cited

U.S. PATENT DOCUMENTS

| 2,083,439 | A | * | 6/1937 | Fedden ......................... 416/207 |
| 3,734,642 | A | * | 5/1973 | Dixon .......................... 416/61 |
| 4,169,749 | A | * | 10/1979 | Clark .......................... 156/156 |
| 4,191,506 | A | * | 3/1980 | Packham ....................... 416/91 |
| 4,242,160 | A | * | 12/1980 | Pinter et al. ................. 156/175 |
| 4,260,332 | A | * | 4/1981 | Weingart et al. ............. 416/226 |
| 4,304,524 | A | | 12/1981 | Coxon ......................... 416/131 |
| 4,352,633 | A | | 10/1982 | Tassen ......................... 416/137 |
| 4,755,106 | A | | 7/1988 | Coffy ..................... 416/134 A |
| 4,790,722 | A | | 12/1988 | Herrmann .................... 416/205 |
| 4,915,590 | A | * | 4/1990 | Eckland et al. ............. 416/225 |
| 4,976,587 | A | * | 12/1990 | Johnston et al. ............ 416/230 |
| 5,173,023 | A | * | 12/1992 | Pawlowski et al. ......... 416/207 |

* cited by examiner

Primary Examiner—Ninh H. Nguyen
(74) Attorney, Agent, or Firm—Seed IP Law Group PLLC

(57) ABSTRACT

The present invention concerns a rotor blade hub for a wind power installation. Such a hub represents a mechanical connection between the (horizontal) rotor shaft (rotor spindle) and the rotor blades. This means that all forces which occur at the rotor blades, insofar as they are not forces in the rotor blades themselves, also occur at the hub. Besides the (intentional) rotational forces, these involve inter alia also centrifugal forces and forces, loads and moments which arise out of the action of the wind on the rotor blades. Therefore the object of the present invention is to provide a rotor blade hub which, being of the required dimensions, satisfies all demands for reliable and safe operation of a wind power installation and which ensures secure and as inexpensive as possible transportation to the erection site of the wind power installation. A rotor blade hub for a rotor having at least one rotor blade, formed from at least two individual pieces.

4 Claims, 3 Drawing Sheets

ROTOR BLADE HUB

BACKGROUND OF THE INVENTION

1. Field of the Invention

The present invention concerns a rotor blade hub for a wind power installation.

2. Description of the Related Art

Such a hub represents a mechanical connection between the (horizontal) rotor shaft (rotor spindle) and the rotor blades. This means that all forces which occur at the rotor blades, insofar as they are not forces in the rotor blades themselves, also occur at the hub. Besides the (intentional) rotational forces, these involve inter alia also centrifugal forces and forces, loads and moments which arise out of the action of the wind on the rotor blades.

The rotor hub is accordingly one of the most highly loaded parts of a wind power installation and, as the connection between the rotor blades and the 'rest of the installation', it constitutes the component whose strength must guarantee that no rotor blade can tear away from the installation.

Therefore in the state of the art in most cases rotor blade hubs are produced as a whole from a casting, preferably a component consisting of cast iron with spheroidal graphite.

BRIEF SUMMARY OF THE INVENTION

Therefore the object of the present invention is to provide a rotor blade hub which, being of the required dimensions, satisfies all demands for reliable and safe operation of a wind power installation and which ensures secure and as inexpensive as possible transportation to the erection site of the wind power installation.

The installations which are to be erected in the near future are attaining such dimensions that the required technical procedure for the integral production of a rotor blade hub can scarcely still be properly controlled and the risk of weak locations, for example in the form of blowholes is rising considerably. This means however that reliable manufacture of fault-free rotor blade hubs is no longer possible.

Furthermore at least the transportation on land of large rotor blade hubs of corresponding dimensions can only be implemented at high (disproportionate) cost and necessitates extremely extensive logistical and organization preparations.

The invention proposes that the rotor blade hub is produced in at least two (individual) pieces and that the pieces are permanently assembled to form a rotor blade hub. The pieces can therefore be of such dimensions that transportation even overland can be performed using standard transportation means.

In a preferred embodiment of the invention the number of the individual pieces of the rotor blade hub is at least one greater than the number of rotor blades of the wind power installation. The individual pieces are of a size for which the known technical processes are reliably controlled. On the other hand, in that way division of the rotor blade hub into individual pieces is possible in such a fashion that the nature of the loading on the individual parts can be better taken into account than in the previously known configuration of the rotor blade hub in the form of a casting.

Particularly preferably the rotor blade hub is divided into a so-called hub core and a number of outer hub portions corresponding to the number of rotor blades. In that way each rotor blade can be fixed with a root to an outer hub portion, in which case the outer hub portions are in turn mounted to the hub core so that the loading on the individual connections can be clearly defined.

In a particularly preferred development of the invention provided both on the hub core and also on the outer hub portions are fixing means which permit a durable connection to be made between the outer hub portions and the hub core.

That durable connection can be afforded by screw or rivet connections. It is also possible to adopt a positively locking connection (for example by welding, adhesive, assembling corresponding profiled and mutually matching parts (core and outer portion) (or a combination of the above-mentioned forms of connection)) of the hub core to the outer portions, in which respect care is to be taken to ensure that provision is always made for a sufficiently strong connection between the hub core and the outer portion.

Further preferred embodiments of the invention are described by the features in the appendant claims.

BRIEF DESCRIPTION OF THE SEVERAL VIEWS OF THE DRAWING

A possible embodiment of the invention is described in greater detail hereinafter. In the drawing.

DETAILED DESCRIPTION OF THE INVENTION

Figure 1:
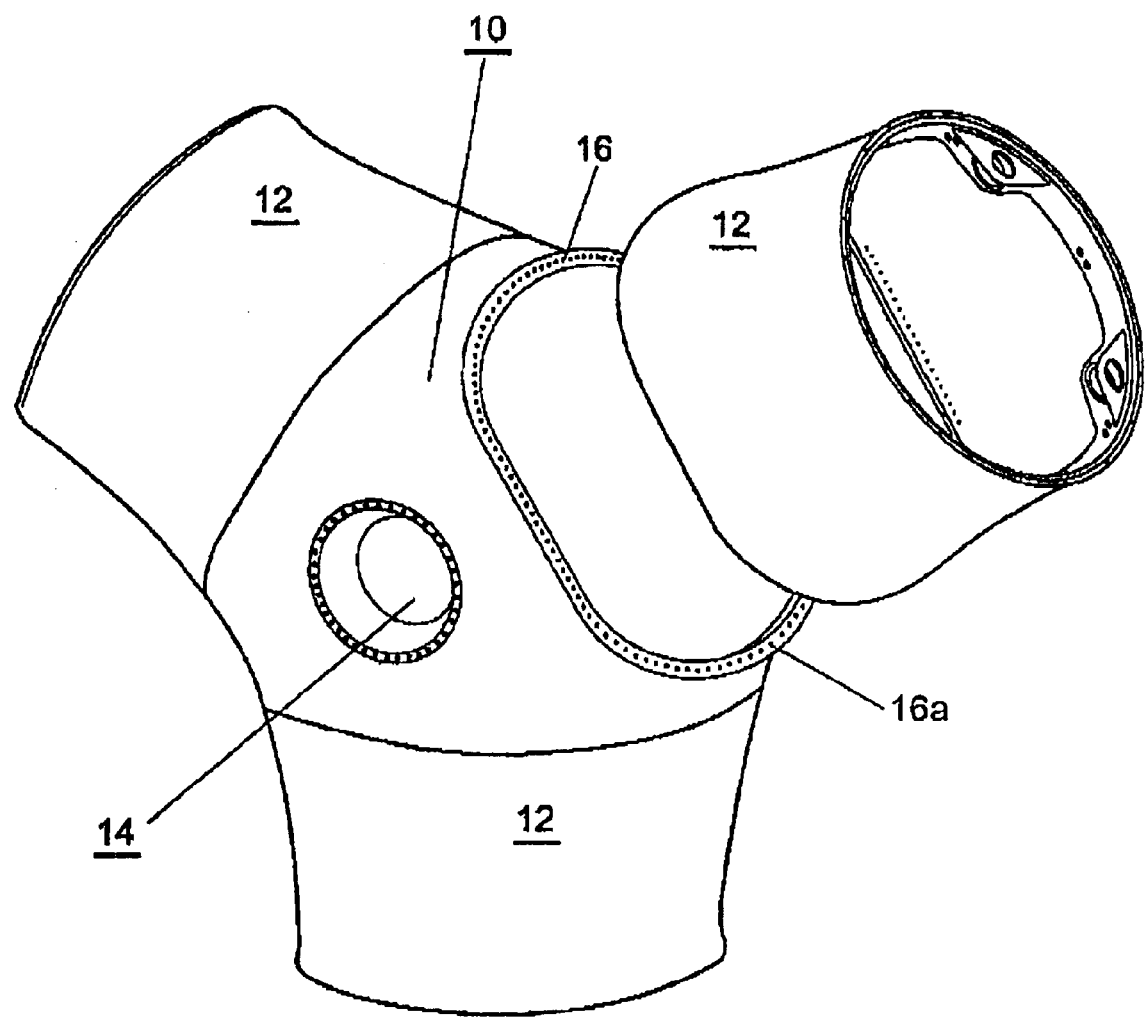
FIG. 1 shows a front isometric view of a hub core and the outer hub portions which are shown separately therefrom.

FIG. 1 shows a hub core 10 (being of a substantially triangular configuration in the view from the front thereof) with a bush 14 for receiving the shaft trunnion (not shown). The rotor blade hub is fitted with that bush 14 on to the rotor shaft (for example the shaft trunnion). Shown at a small distance from the hub core 10 are three outer hub portions 12 which are (and remain) durably fixed to the hub core 10 in the illustrated orientation and to which in turn the rotor blades (not shown) are fixed in known manner (see in that respect: Erich Hau 'Windkraftanlagen' ['Wind Power Installations']).

In accordance with a preferred embodiment of the invention FIG. 1 shows a rotor blade hub for carrying three rotor blades. Accordingly the rotor blade hub has three outer hub portions, a respective one for the connection of each rotor blade, and the hub core 10, as a fourth individual piece of the rotor blade hub. This means that the rotor blade hub is formed from a number of individual pieces (which are assembled together), the number thereof being one greater than the number of rotor blades (not shown).

In order to achieve sufficient strength in respect of the material involved, the individual pieces are preferably produced in a casting process and thus consist of cast iron of a suitable composition. In that respect the individual pieces are of a size in relation to which the production process thereof can be safely and properly controlled. It is possible in that way to ensure that, as a consequence of trouble-free individual pieces, the rotor blade hubs produced therefrom also safely and properly satisfy the high demands made.

Figure 2:
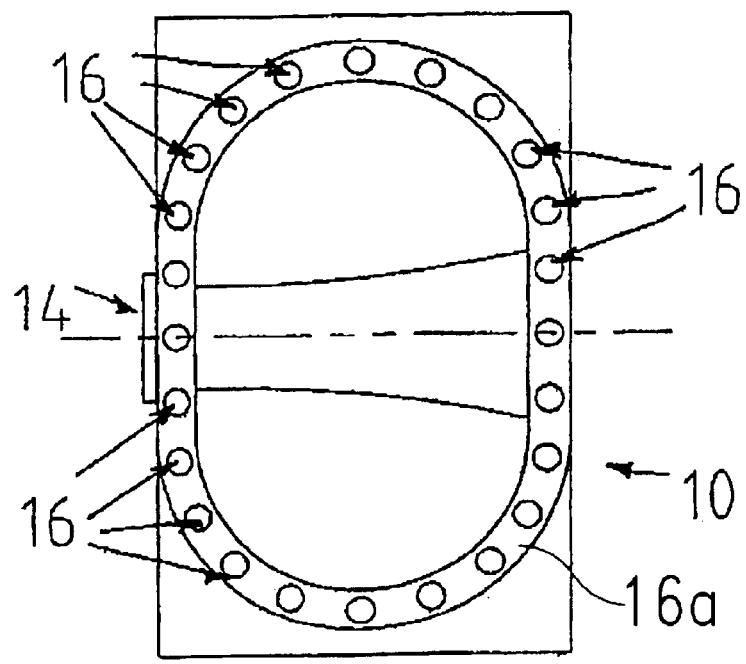
FIG. 2 shows a side view of the hub core.

FIG. 2 shows a side view of the hub core 10. In this case the view is directly on to a fixing flange 16a (mounting) of substantially oval shape with screw holes 16 for fixing an outer hub portion 12 to the hub core 10. The screw holes 16 are arranged distributed over the flange 16a and the number is such that it is possible to make a secure connection between the outer hub portion 12 and the hub core 10. FIG. 2 further shows the rotor shaft bush 14 which can be seen through the opening in the hub core (for bearing on the shaft trunnion). The fixing flange 16a does not necessarily have to be of an oval shape, it may also be circular or of a polygonal configuration.

Figure 3:
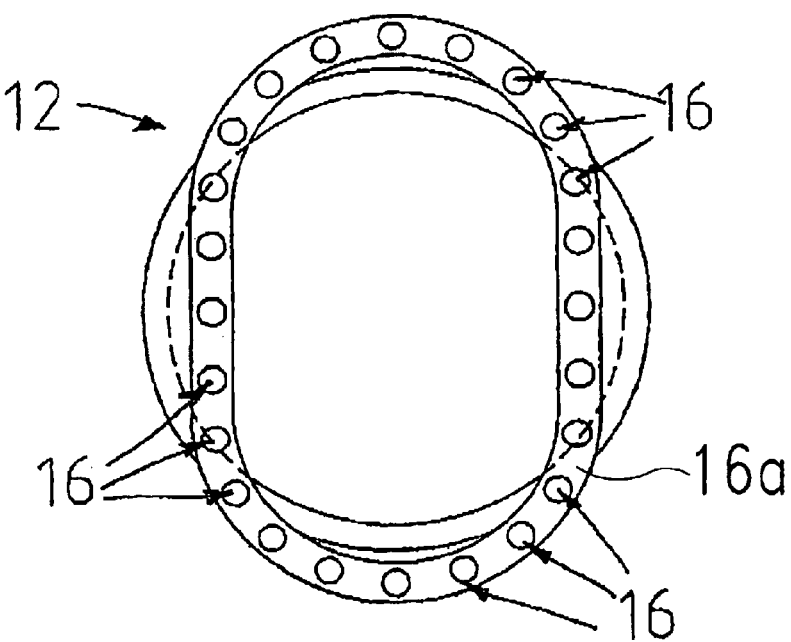
FIG. 3 shows a side view of an outer hub portion.

FIG. 3 shows a view of an outer hub portion 12 from the side, which after assembly of the rotor blade hub 10, 12, 14, bears against the flange 16a of the hub core 10. Also provided on that outer hub portion 12 is a fixing flange 16a of a substantially oval shape and having openings 16. In this respect the number and position of the screw holes 16 correspond to those of the hub core 10 so that they are in exactly opposite relationship in an assembled condition.

FIG. 3 further indicates a possible substantially circular rotor blade connecting means of the outer hub portion 12. In order to retain clarity of the Figure, fixing means have not been shown here.

For assembly of the rotor blade hub the outer hub portions 12 are applied to the hub core 10 and, as soon as the outer hub portion 12 is in the correct position with respect to the hub core 10, the individual pieces 10, 12 are durably connected together by for example being screwed to each other. In that respect however all known technical processes for connecting such individual pieces are possible, while non-releasable connecting methods such as for example welding and adhesive are also to be considered.

Figure 4:
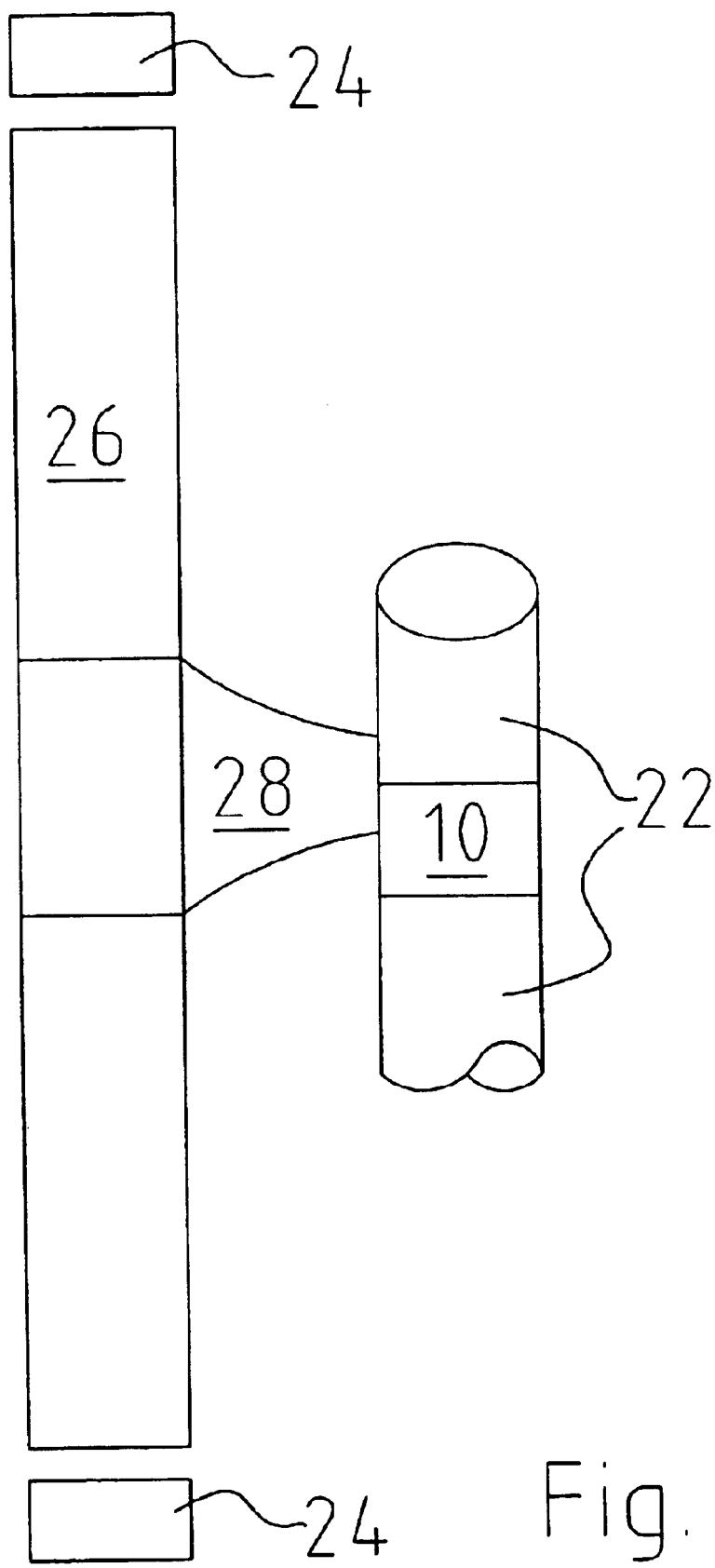
FIG. 4 shows a side view of a hub.

FIG. 4 shows an elevational view of a wind power installation with a rotor blade hub 10 which carries three rotor blades 22. The rotor blade hub 10 is directly secured to the rotor member 26 of a generator and the rotor member 26 of the generator rotates within the stator 24 of the generator. Both the hub 10 and also the rotor member 26 of the generator are mounted rotatably on a shaft trunnion 28.

The illustrated wind power installation preferably involves a wind power installation with a very high output, preferably more than three MW. The assembled hub is of a diameter of more than 2.50 m (from the view as shown in FIG. 1).

What is claimed is:

1. A rotor blade hub for a rotor having at least one rotor blade, the rotor blade hub comprising a hub core and at least one outer hub portion for receiving a rotor blade, wherein the hub core and the at least outer hub portion each has a corresponding flange which is of substantially oval shape and by which the outer hub portion and the hub core are connected together.

2. A rotor blade hub as set forth in claim 1 wherein the number of the individual pieces of the rotor blade hub is at least one greater than the number of the rotor blades receivable by the hub.

3. A wind power installation having a rotor blade hub as set forth in claim 1.

4. A process of producing a rotor blade hub from a wind power installation from at least two individual pieces which are assembled together to form the hub, the process comprising:

affixing to a hub core at least one outer hub portion, the outer hub portion comprising fixing means for attaching a rotor blade to the outer hub portion, wherein affixing said hub core and said outer hub portion comprises affixing a part of said outer hub portion having a substantially oval shape to a part of said hub core having a substantially oval shape.

* * * * *